Dec. 17, 1957 T. H. STANLEY 2,816,962

STEADY-STATE SIGNALLING USING ALTERNATING CURRENTS

Filed Nov. 10, 1954 3 Sheets-Sheet 1

Inventor
Thomas H. Stanley
by Ward, Neal, Haselton, Orme & McElhannon
Attorneys

STEADY-STATE SIGNALLING USING ALTERNATING CURRENTS

Filed Nov. 10, 1954 3 Sheets-Sheet 2

Inventor
Thomas H. Stanley
by [signature] Attorneys

STEADY-STATE SIGNALLING USING ALTERNATING CURRENTS

Filed Nov. 10, 1954 3 Sheets-Sheet 3

Inventor
Thomas H. Stanley
by Ward, Neal, Haselton, Orme & McElhannon
Attorneys

United States Patent Office 2,816,962

Patented Dec. 17, 1957

2,816,962

STEADY-STATE SIGNALLING USING ALTERNATING CURRENTS

Thomas H. Stanley, Ryde, New South Wales, Australia, assignor to T. S. Skillman and Company Pty. Limited, Cammeray, near Sydney, Australia, a corporation of New South Wales Application November 10, 1954, Serial No. 468,127

4 Claims. (Cl. 179—41)

Figure 1:
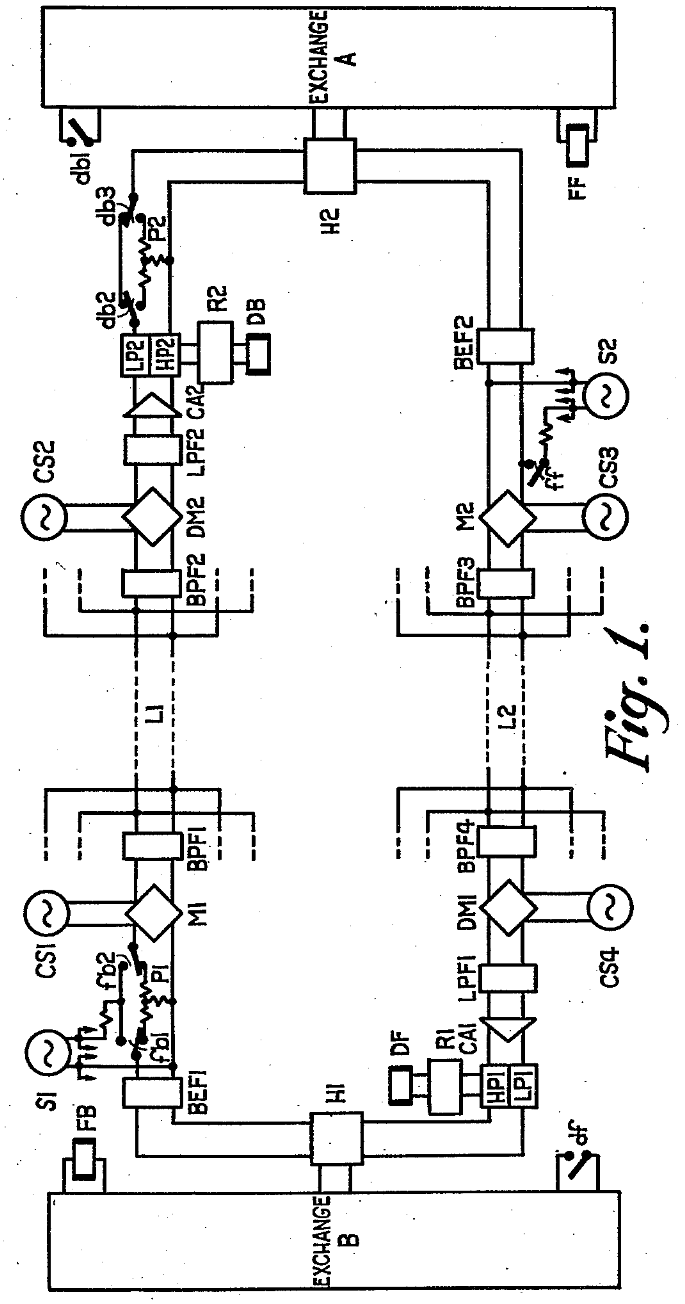

The invention relates to telephone systems and more specifically to the signalling arrangements in those systems in which control, switching, supervisory or like signals are of so-called "steady-state" and are transmitted as alternating currents.

In systems of this kind the structure and transmission of signals follow the direct current signalling schedule in which a signal consists of the transition from one steady state to another, so that signalling over a trunk line which transmits only alternating currents (or transmits them with better stability etc. then direct currents) proceeds in the same manner as over a local line permitting the flow of direct current (see, for example, "Communication Review," vol. 1, No. 3, pages 5 and 6, Sections 3.1 to 3.3).

Systems are known in which, for example, the voice is transmitted by modulation of carrier frequencies and the latter frequencies themselves are used for signalling purposes, as, for example, described in United States patent specification No. 2,564,378, or a frequency not used or excluded from speech transmission is employed for the transmission of signals, and this signal frequency is either modulated on to the carrier together with the speech frequencies in case of a carrier system or directly transmitted in case of voice frequency lines.

The so-called "steady-state" signalling method has the very great advantage that the signalling path is immune against voice interference during much of the time owing to the fact that the signal receiver is usually in its operated condition when voice frequencies are liable to be transmitted and that, therefore, no false operation by voice frequencies can occur during this period.

There are, however, occasions where the signal receiver in the backward direction of transmission is not operated during the transmission of speech. Such a case occurs, for example, when a call has been made from one (outgoing) exchange to another (incoming) exchange and conversation with an operator at the incoming exchange is liable to be necessary prior to the answering of the called subscriber connected with this exchange. In this case the signal receiver at the outgoing exchange is in its unoperated condition prior to the occurrence of a supervisory signal indicating that the called subscriber has answered. To protect the signalling channel receiver against false operation by voice components falling directly in the band around the signalling frequency filters can be provided which attenuate these components. As such a protection is required only in the backward direction of transmission prior to the supervisory signal the use of sharp filters is very uneconomical, and it has, therefore, been proposed to either reduce the level of transmitted speech or the sensitivity of the signal receiver during this period. Such systems are described in United States patent application Serial No. 463,237, filed October 19, 1954, by Thomas S. Skillman. These arrangements, however, give no protection against frequencies produced from speech by distortion in the subsequent parts of the transmission equipment. Such distortion frequencies can fall within the range of frequencies used for signalling and thus can easily initiate false receiver operation. One of the major objections against such false operation is of course, that, for example, a supervisory signal is used for operating subscribers' meters and any false operation would wrongly charge the calling subscriber.

To avoid undue inter-system interference from steady state signalling tones, it has been laid down that generally the signalling level should be about −26 dbm at a point of zero planning level (defined, for example, in "Communication Review," vol. 1, No. 2, page 34) as the level at the point of consideration over the level at the input trunk test board in the telephone path whereby the expression "dbm" means the power level with reference to 1 mw. It is a further requirement that the overall distortion of a transmission path should be reasonably small; it is usually required to be less than 5% at a power output corresponding to a test power of +8 dbm at a point of zero planning level; thus the total power of harmonic distortion of all harmonics should be better than 26 db below the test tone.

The difficulties which can arise from these requirements can be seen hereafter from a numerical example.

It may be assumed that the frequency range of the transmitted speech is 300–3100 c./s. and that signalling is carried out with a signal frequency of 3400 c./s. This latter frequency would be produced by harmonics of the following speech frequencies:

2nd harmonic of 1700 c./s.
3rd harmonic of 1133 c./s.
4th harmonic of 850 c./s.
5th harmonic of 680 c./s.

Assuming that any one, for example 2nd or 3rd, harmonic is 26 db below the fundamental frequency at peak speech level of +8 db, then the 3400 c./s. speech products resulting from distortion are $$+8 \text{ dbm} - 26 \text{ db} = -18 \text{ dbm}$$

Taking the nominal level of steady signalling tone as −26 dbm at a point of zero planning level in the "on" condition, the maximum "non-operate" level can be found from the following considerations which are of very general practicable applicability (or from similar considerations where the numerical behaviour of the signalling receiver is different):

It is usual (and quite practicable) to require that a tone nominally 10 db below the signalling tone "on" level will never operate the receiver, despite gain variations in the transmission path of up to ±3 db (at least). This means that the minimum operate level (never fails to operate) with pure tone input becomes −29 dbm at a point of zero planning level so that the maximum non-operate level (never operates with pure tone input) becomes −33 dbm at a point of zero planning level. These points are 4 db apart. It is possible to have them closer by differently designing the signalling receiver, but this spread is quite easy to obtain and it is rarely that the need for any closer approach of these two limits is felt.

The maximum non-operate level of −33 dbm is so far below the abovementioned distortion level of −18 dbm (both at a point of zero planning level) that frequent false operation of the signal receiver will occur whenever operators' conversations take place.

According to the invention the abovementioned difficulties are overcome in a telephone system in which calling, supervisory, clearing signals and the like are given in the so-called steady state form and are transmitted in the forward and backward direction as alternating currents of particular signal frequencies not used for or excluded from use for speech transmission, and in which distortion in the transmission path produces from the transmitted voice energy new frequencies in the vicinity of said particular signal frequencies to render ineffective the filters attenuating the original voice components in the band of the signalling path, said new frequencies having at the input of the signal receiver level peaks higher than the maximum non-operative limit of the receiver determined by the level to be used for signalling, by the inclusion at appropriate times of attenuating means in the speech transmission path for the backward direction to reduce the planning level at the equipment causing the distortion in this path. These attenuating means are inserted in the path upon occurrence of the decrease in level of the signalling tone and are switched out of the path upon occurrence of the increase in level of said tone. Although the percentage of harmonic distortion is not changed by these attenuation means, a reduction in speech level not only reduces the level of harmonic distortion accordingly, but owing to the non-linear order of the distortions a deficiency of a certain value "D" in the margin against false operation of the signal receiver can be corrected by an attenuating pad in the speech path of a value less than "D"; or a pad of value "D" will wipe out the deficiency and leave an actual non-zero margin against false operation.

In a further form of the invention further attenuating means are inserted following the equipment causing the distortion and are switched in and out of the path in opposite sense to the first mentioned attenuating means to maintain the through loss of the transmission path constant before and after changes in level of the signalling tone.

The invention will be described hereafter in connection with the drawings in which Fig. 1 shows the transmission path of a carrier telephone system using a signal frequency at the end of the speech band and including attenuating pads in the backward direction of transmission in accordance with the invention.

Figure 2:
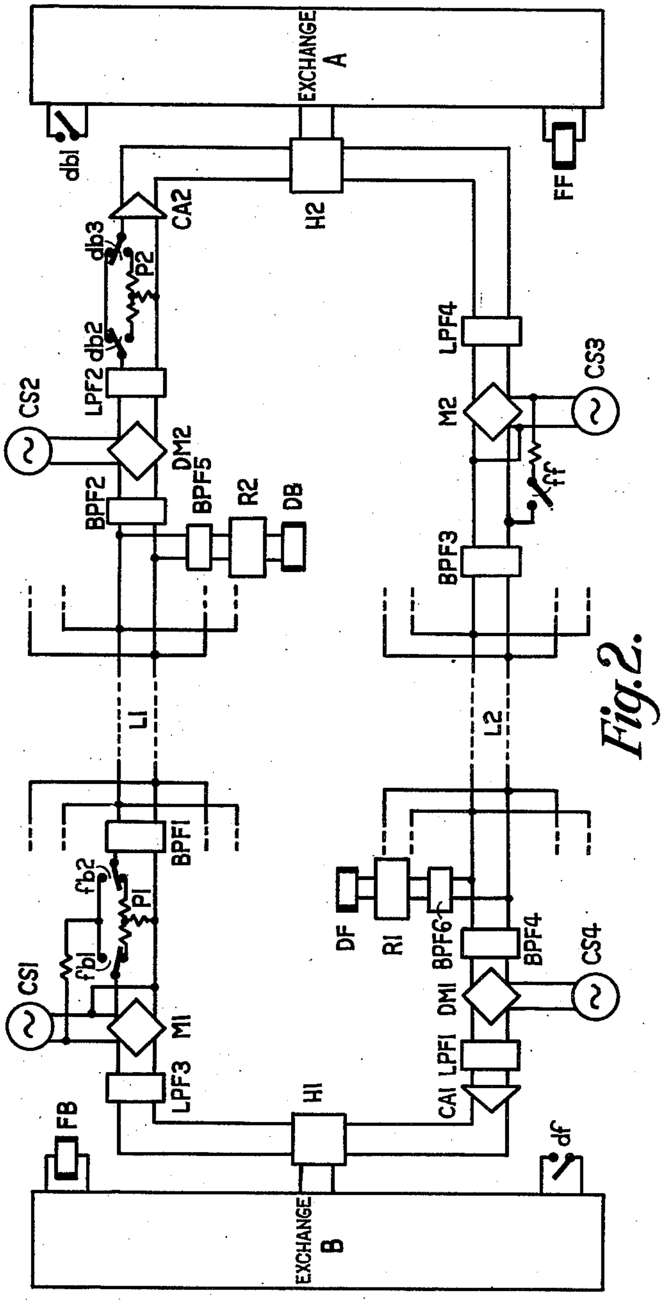

Fig. 2. shows a similar arrangement in which the carrier frequency itself is used for signalling.

Figure 3:
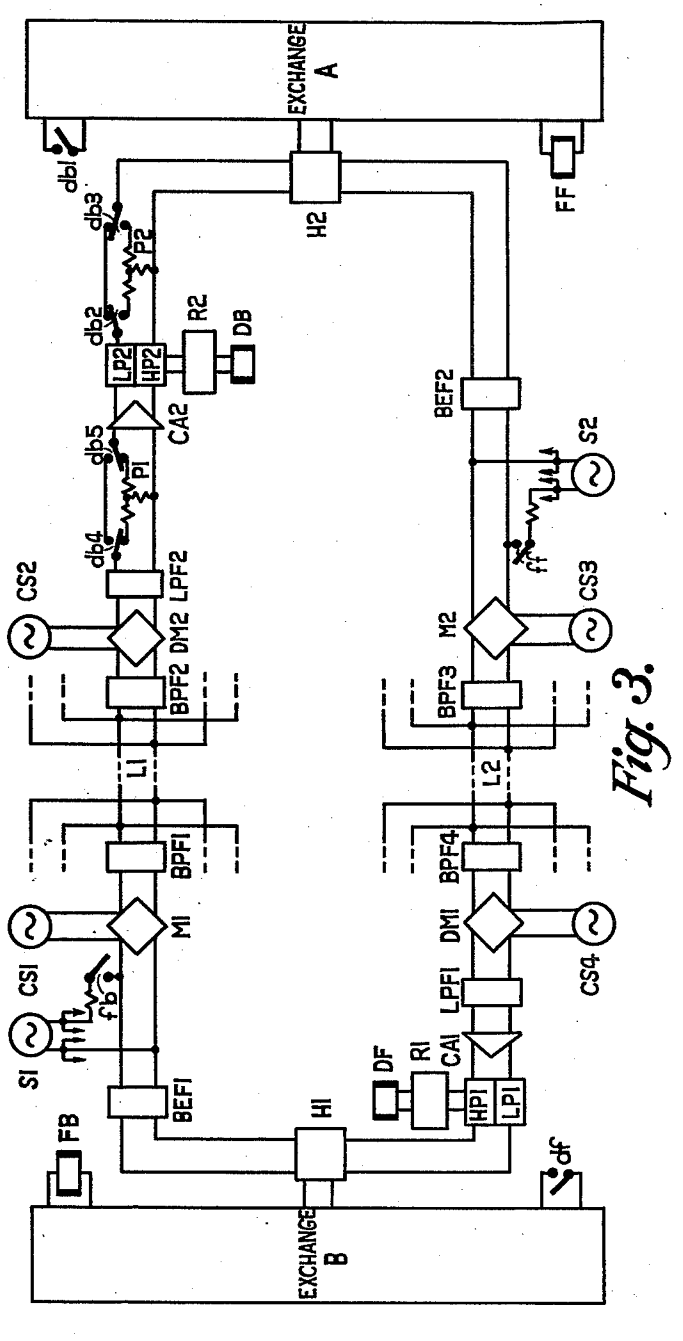

Fig. 3 shows an arrangement similar to the arrangement of Fig. 1 in which distortion is primarily caused at the receiving end.

In Fig. 1 a 4-wire circuit or link L1, L2 is shown which connects over the hybrid transformers H2 and H1 the exchanges A and B by a multi-channel carrier system. One channel only is shown in detail but it must be understood that other channels can be treated in the same way. The circuits are shown in the state prior to the establishing of a connection. The relay FF connected with exchange A is operated in known manner to give a call signal at the start of a connection and a clear signal at the end thereof, while a similar relay FB connected to exchange B is used to convey a supervisory signal indicating that the called subscriber has answered, as well as the backwards clear signal. The various signals are transmitted over links L1 and L2 to operate the signal relays DF and DB respectively to transmit the signals into the corresponding exchange by contact *df* (exchange B) and contact *db*1 (exchange A), as will appear later.

When a subscriber attached to exchange A calls for a connection to a subscriber connected to exchange B the calling relay FF is energized in known manner to close its contact *ff*. Thus a signal current of a frequency at the upper (or lower) end of the speech band is sent from the signal generator S2 to the modulator M2 where it modulates the carrier frequency from source CS3. One sideband is passed through the band pass filter BPF3 and over link L2 and through band pass filter BPF4 to the demodulator DM1 in which the sideband is demodulated by the carrier frequency from source CS4. The signal frequency is then passed through the low pass filter LPF1 and the channel amplifier CA1 to the low pass-high pass filter combination LP1—HP1 and through the high pass filter to the signal receiver R1 thus operating relay DF.

Over contact *df* the call signal is then transmitted into exchange B. Prior to the called subscriber's answer operators' conversation can be carried out over the carrier links. The speech frequencies from an operator at exchange A are transmitted over hybrid transformer H2 and band elimination filter BEF2 and then in the same way as described above for the signal frequency. The band elimination filter prevents a transmission of the signal frequency back into the exchange. The speech frequencies arriving at the low pass-high pass filter combination LP1—HP1 pass through the low pass filter LP1 and then through hybrid transformer H1 into the exchange B.

In the backward direction from exchange B to exchange A operator's conversation is carried out by transmitting speech frequencies over hybrid transformer H1 and via the filter BEF1 (which also guards the signalling channel from speech components falling in the signal band), and then over attenuation pad P1 previously switched into circuit at contacts *fb*1 and *fb*2 of relay FB to modulator M1. In the modulator M1 the speech frequencies are modulated by a carrier frequency from source CS1, and assuming a balanced modulator, one sideband is transmitted through band pass filter BPF1 and over line L1 to demodulator DM2 connected with exchange A. In the demodulator DM2 the frequencies are demodulated by a carrier frequency from source CS2 and the speech frequencies then pass through low pass filter LPF2 and channel emplifier CA2 to low pass-high pass filter LP2—HP2, and from there over contacts *db*2 and *db*3 to hybrid transformer H2 and exchange A.

A signal receiver R2 with relay DB is connected over the high pass filter HP2 with the transmission path, as in the example shown it is assumed that signalling is carried out by a signal frequency just above the frequency band used for transmission of speech.

Assuming that the pad P1 would not be in the circuit distortion caused mainly by modulator M1 and channel amplifier CA2 could reach such a level that false operation of the signal receiver could occur. By reducing the effective speech level at the input of the modulator a reduction of distortion frequencies is achieved in the speech path up to LP2—HP2; which gives enough margin against false operation, when sufficient speech level reduction is introduced as explained above. As only operator's conversation is carried out during this period a reduction in level and consequent small increase in noise may be permissible. But it is advantageous to retain the overall loss of the circuit by inclusion of a pad P2 at contacts *db*2 and *db*3, and this necessitates using an amplifier CA2 of greater test tone load capacity (giving a higher output power without increasing the percentage distortion).

When the called subscriber connected to exchange B answers relay FB is operated in known manner to give the supervisory signal, and stays operated while the through-connection is maintained. Relay FB changes over its contacts *fb*1 and *fb*2, removes pad P1 from the circuit and connects the signal frequency from source S1 to the transmission path, thus repeating the steady state signal in relay FB as alternating current in place of the direct current up to relay FB. This frequency is transmitted after modulation in modulator M1 over link L1 to exchange A, where it is demodulated and operates over high pass filter HP2 the signal receiver R2 and thus relay DB. This relay repeats the supervisory signal into the exchange A in direct current form by closing its contact *db*1 and at the same time switches over its contacts *db*2 and *db*3 to insert attenuation pad P2 in the speech transmission path, thus maintaining the level of incoming speech which would otherwise rise owing to the fact that pad P1 has been taken out of circuit.

The following speech transmission and the distortion derived therefrom can have no detrimental effect on the signal receiver R2 as this receiver remains operated by the signal frequency transmitted from the signal source S1. Similarly the signal receiver R1 remains energized during conversation by signal frequency from source S2.

At the end of the conversation relay FB is released again by the backward clearing signal thus disconnecting the signal source S1 from the line and re-inserting pad P1 into the circuit. Receiver R2, therefore, releases relay DB which repeats the clearing signal back into exchange A by opening its contact *db*1, and at the same time removes pad P2 from the circuit at contacts *db*2 and *db*3. In the same way a clear signal is transmitted from exchange A to exchange B by the release of relay FF and thus relay DF. The transmission path is now ready for the next connection.

Although the invention is described above in connection with a carrier telephone system using a signal frequency on top of the speech frequency band, the invention can be applied generally to carrier systems in which a signal frequency is used which is not used for or is excluded from use for speech transmission. The invention can be applied also to carrier telephone systems in which the carrier frequency itself is used for signalling, as shown hereafter in connection with Fig. 2. When applied to voice frequency systems in which distortion may arise, for example, at the repeater points, the arrangement is the same as shown in Fig. 1 omitting the modulators and demodulators.

In the arrangement of Fig. 2 a call signal from exchange A to exchange B is transmitted by operation of relay FF, which over contact *ff* connects the source of carrier current CS3 with the channel to transmit this frequency through filter BPF3 and link L2 and further through band pass filter BPF4 and signal receiver R1 to relay DF, which at contact *df* passes the call signal into exchange B.

Operator's conversation from exchange A to exchange B is carried out by modulating the speech frequencies passed over hybrid transformer H2 and low pass filter LPF4 in the modulator M2 by the carrier frequency CS3. One sideband is transmitted over link L2 and passes through filter BPF4 into demodulator DM1 where it is demodulated by the carrier frequency from source CS4. The resulting speech frequencies pass through filter LPF1, channel amplifier CA1 and hybrid transformer H1 into exchange B. In the backward direction operator's conversation is carried out in the same way. However, the output of modulator M1 is reduced in level by pad P1 before being passed on to the link L1. The arrangement of the pad past the modulator is advantageous when the carrier itself is used for signalling to reduce any carrier leak from the modulator M1 which might affect the receiver R2. On the other end of link L1 the transmitted sideband passes through filter BPF2 into demodulator DM2, and after demodulation by carrier CS2 the speech frequencies reach the exchange A over filter LPF2, contacts *db*2 and *db*3, amplifier CA2 and hybrid transformer H2. The supervisory signal given by operation of relay FB is given by connecting the source of carrier current CS1 with the channel, at the same time removing the pad P1 therefrom. The transmitted carrier frequency operates over filter BPF5 the receiver R2 and thus relay DB to transmit the signal over contact *db*1 into exchange A and to place pad P2 at contacts *db*2 and *db*3 into the channel to maintain the proper level for the following speech transmission. Clear signals in the forward and backward directions are given in the same way as described above in connection with Fig. 1.

In cases where the distortion is primarily caused by the channel amplifier at the receiving end, the attenuating pad P1 can be arranged at the receiving side preceding this amplifier and is then switched by contacts of relay DB. In this later case the receiver R2 has to be more sensitive to operate from a signal tone reduced in level by pad P1, but the advantages of a reduction in distortion are still maintained.

An arrangement of this kind is shown in Fig. 3. The arrangement in the forward direction from exchange A to exchange B is identical with that of Fig. 1 and signals and conversation are transmitted in the same way as described earlier. In the backward direction, however, the attenuation pad P1 is shifted to the other side of the link L1 in front of amplifier CA2 and is operated by further contacts *db*4 and *db*5 of relay DB. Thus, when the signal source S1 is connected with the channel at operated contact *fb* the signal receiver has to operate over the pad P1, but once operated removes this pad and switches pad P2 into circuit instead to maintain a constant level for speech frequencies transmitted from exchange B to exchange A before and after the supervisory signal.

Further modifications are possible within the scope of the invention as long as the attenuating means precede the equipment causing distortion in the speech transmission path.

I claim:

1. In a telephone system having a first terminal, a second terminal and a transmission path including a forward and a backward speech and signalling path between said terminals to establish selected connections between said terminals, signal means at said first and said second terminal to transmit different signals over said forward and said backward speech and signalling path in the steady state form as changes in level of alternating currents of a particular signal frequency for each direction other than the frequencies employed in speech transmission, a signal receiver at each of said terminals and filtering means associated with each of said signal receivers to attenuate the original voice components in the signal frequency bands, transmission equipment in said transmission path, said equipment causing distortion of the transmitted voice energy and producing new frequencies in the vicinity of each of said particular signal frequencies against which said filtering means are ineffective, said new frequencies having at the input of said signal receivers level peaks higher than the maximum non-operate limit of said receivers determined by the level of said corresponding signal frequency, attenuating means, and switching means to insert said attenuating means into said backward speech and signalling path preceding said transmission equipment causing distortion in said backward path, to reduce the level of voice energy at said equipment and thus said level peaks at said corresponding receiver below said maximum non-operative limit, said switching means inserting said attenuating means into said path at a decrease in level of said corresponding signal frequency and removing said attenuating means from said path at an increase in level of said signal frequency.

2. In a telephone system having a first teminal, a second terminal and a transmission path including a forward and a backward speech and signalling path between said terminals to establish selected connections between said terminals, signal means at said first and said second terminal to transmit different signals over said forward and said backward speech and signalling path in the steady state form as changes in level of alternating currents of a particular signal frequency for each direction other than the frequencies employed in speech transmission, a signal receiver at each of said terminals and filtering means associated with each of said signal receivers to attenuate the original voice components in the signal frequency bands, transmission equipment in said transmission path, said equipment causing distortion of the transmitted voice energy and producing new frequencies in the vicinity of each of said particular signal frequencies against which said filtering means are ineffective, said new frequencies having at the input of said signal receivers level peaks higher than the maximum non-operate limit of said receivers determined by the level of said corresponding signal frequency, first attenuating means and first switching means to insert said attenuating means into said backward speech and signalling path preceding said transmission equipment causing distortion in said backward path, to reduce the level of voice energy at said equipment and thus said level peaks at said corresponding receiver below said maximum non-operate limit, said switching means inserting said attenuating means into said path at a decrease in level of said corresponding signal frequency and removing said attenuating means from said path at an increase in level of said signal frequency, and second attenuating means and second switching means to switch said second attenuating means into and out of said backward speech and signalling path in opposite sense to said first attenuating means at a point following said transmission equipment causing distortion in said backward path, to maintain the through loss of the transmission path constant before and after changes in level of said signal frequency.

3. In a telephone system having a first terminal, a second terminal and a transmission path including a forward and a backward speech and signalling path between said terminals, signal means at said first and said second terminal to transmit different signals over said forward and said backward speech and signalling path in the steady state form as changes in level of alternating currents of a particular signal frequency for each direction other than the frequencies employed in speech transmission, a signal receiver at each of said terminals and filtering means associated with each of said signal receivers and connecting each said signal receiver with a corresponding speech and signalling path, distortion causing transmission equipment in said transmission path, first attenuating means and first switching means to insert said attenuating means into said backward speech and signalling path preceding said distortion causing transmission equipment, said switching means switching said attenuating means into and out of said path depending on the level of said corresponding signal frequency, and second attenuating means and second switching means to switch said second attenuating means into and out of said backward speech and signalling path in opposite sense to said first attenuating means at a point following said distortion causing transmission equipment and past the point of connection of said signal receiver with said backward path direction.

4. In a telephone system having a first terminal, a second terminal and a transmission path including a forward and a backward speech and signalling path between said terminals, signal means at said first and said second terminal to transmit different signals over said forward and said backward speech and signalling path in the steady state form as changes in level of alternating currents of a particular signal frequency for each direction other than the frequencies employed in speech transmission, a signal receiver at each of said terminals and filtering means associated with each of said signal receivers to attenuate the original voice components in the signal frequency bands, transmission equipment in said transmission path, said equipment causing distortion of the transmitted voice energy and producing new frequencies in the vicinity of each of said particular signal frequencies against which said filtering means are ineffective, said new frequencies having at the input of said signal receivers level peaks higher than the maximum non-operate limit of said receivers determined by the level of said corresponding signal frequency, a first attenuation pad connectable into said backward speech and signalling path preceding said transmission equipment causing distortion in said backward path, to reduce the level of voice energy at said equipment and thus said level peaks at said corresponding receiver below said maximum non-operate limit, a supervisory relay included in said signal means at said second terminal, and contacts of said relay switching said first attenuation pad into and out of said backward path with changes in level of said corresponding signal frequency, said supervisory relay upon operation transmitting said signal frequency from said second terminal to said first terminal, a second attenuation pad connectable into said backward path following said transmission equipment causing distortion in the backward path to maintain the through loss of the transmission path constant before and after changes in level of said signal frequency, and a signal relay in the output circuit of said signal receiver for said backward path at said first terminal, and contacts of said signal relay switching said second attenuation pad into and out of said backward path in opposite sense to said first attenuation pad.

References Cited in the file of this patent

UNITED STATES PATENTS

| | | |
|---|---|---|
| 2,563,311 | Davison et al. | Aug. 7, 1951 |
| 2,651,684 | Hargraves et al. | Sept. 8, 1953 |
| 2,658,112 | Davison et al. | Nov. 3, 1953 |